United States Patent [19]

Gloeckler

[11] 3,806,717

[45] Apr. 23, 1974

[54] METHOD AND MEANS FOR SIMULTANEOUSLY TESTING COUNTER CHECK CIRCUITS

[75] Inventor: Walter Gloeckler, Elk Grove Village, Ill.

[73] Assignee: GTE Automatic Electric Laboratories Incorporated, Northlake, Ill.

[22] Filed: Jan. 2, 1973

[21] Appl. No.: 320,019

Related U.S. Application Data

[63] Continuation-in-part of Ser. No. 317,436, Dec. 21, 1972.

[52] U.S. Cl. .................. 235/153 AP, 340/146.1 AB

[51] Int. Cl. .......................................... G06f 11/00

[58] Field of Search ............ 340/146.1 AB, 146.1 R, 340/172.5; 235/153 A, 153 AP; 179/175.2 C

[56] References Cited

UNITED STATES PATENTS 3,401,379 9/1968 Prell et al. ................ 340/146.1 AB 3,428,945 2/1969 Toy .......................... 340/146.1 AB

*Primary Examiner*—Charles E. Atkinson

*Attorney, Agent, or Firm*—Robert J. Black

[57] ABSTRACT

An automatic common control switching system is disclosed which includes a trunk identifier, a register-sender selector, a link selector and a sequence state controller for connecting any one of a number of trunks through a switching network to an idle register-sender. The trunk identifier, the register-sender, the link selector and the sequence state controller include counters which form scanners and/or timing interval generators, and check circuits are provided for monitoring the proper operation of these counters. In addition, a method and means are provided for simultaneously testing the proper operation of these counter check circuits, either during "off-line" or "on-line" operation.

7 Claims, 10 Drawing Figures

REG. / SENDER SELECTOR

METHOD AND MEANS FOR SIMULTANEOUSLY TESTING COUNTER CHECK CIRCUITS

This application is a continuation-in-part of U. S. Pat. application Ser. No. 317,436, filed on Dec. 21, 1972.

BACKGROUND OF THE INVENTION

This invention relates to an automatic common control switching system for local and/or toll tandem switching. More particularly, it relates to a method and means for simultaneously testing of up to 10 "one-out-of-10" checking circuits which are used for monitoring the counters used in such a system, during both on-line and off-line operation.

The operation of the automatic common control switching system, or crosspoint tandem system as it is commonly referred to, is generally as follows. Each incoming trunk has two major appearances in the crosspoint tandem office, one on a trunk link frame (used for the talking connection) and one on a register-sender access subsystem (used for passing information to the common control equipment). The register-sender access subsystem is the first of the trunk appearances to be used. It consists of two sets of relay switches, with one set comprising trunk switches and the other set comprising register-sender switches. The incoming trunks appear on the trunk switches and the register-senders on the register-sender switches. As soon as the incoming trunk is seized, it signals a control unit of a register-sender access subsystem to connect an idle register-sender for registering the incoming pulses. The control unit sets up the connection, passes the trunk link inlet identity and trunk pre-translation class of service to the register-sender, and releases from the connection to be free to serve other calls.

As soon as the sender is attached, it signals the originating operator or preceding office sender to begin pulsing. When all of the digits are received, the register-sender signals an assigner to seize a translator. On calls originated from dial-pulse trunks, translation may be called for after the third digit to permit resolution of the ambiguities which follow from the introduction of interchangeable MPA and office codes.

When the translator is connected, the register-sender passes the trunk link inlet identity and dialed code digits to the translator. Using these indications, the translator determines the routing information, passes outpulsing instructions back to the register-sender, and signals the assigner to seize an idle marker. The assigner signals the register-sender to connect to the same marker.

When a marker is connected, the translator passes to the marker the trunk link inlet identity, the outgoing trunk group identity, and (sequentially) the identity of two office link frames which access the outgoing trunk group and the translator releases from the call.

The marker than simultaneously seizes the trunk link matrix connect that accesses the trunk links that serve the incoming trunk and seizes the office link matrix connected that accesses the trunk of the outgoing trunk group that appear on one of the two office link frames. The marker selects an idle outgoing trunk, sends a seizure signal forward to the succeeding office and siezes the office link matrix connect that accesses the office links that serve the selected outgoing trunk. The marker then seizes the trunk link matrix connect that accesses the junctors that serve both the incoming trunk and the outgoing trunk.

The marker now has access to the test leads for the trunk links, junctors and office links, and it proceeds to set up the connection from the incoming trunk to the outgoing trunk. It makes the channel test by testing groups of three leads simultaneously, selects one group, and then operates the crosspoints to establish the selected channel. The marker signals the register-sender that the path has been established and the marker releases from the call.

The sender then outpulses as it has been directed by the translator and cuts through the talking path. The register-sender and register-sender access then release and the call is under control of the incoming trunk. When the incoming trunk receives a release signal from the preceding office, it releases the connection through the office.

The register-sender access subsystem of the described crosspoint tandem system interfaces the incoming trunk circuits with the register-senders, and serves 1,000 trunks maximum and 100 register-senders maximum. The trunks and register-senders are subdivided into two subgroups of 500 trunks maximum and 50 register-senders maximum. Each subgroup normally operates independently, but the control unit of one subgroup is capable of serving both subgroups of the pair in case of trouble.

A subgroup consists of a number of trunk switches, a number of register-sender switches, and an electronic control unit. These trunk and register-sender switches all are relay switches generally of the type disclosed in U.S. Pat. No. 2,573,889, issued Nov. 6, 1951. The incoming trunk circuits are connected to the trunk switches, and each trunk switch is connected back-to-back with a register-sender switch. The register-sender switches in a subgroup are multiplied together and connected to a number of register-senders.

On seizure, an incoming trunk circuit closes two call for service leads. By scanning these leads, the control unit identifies the calling trunk and selects an idle trunk switch, an idle register-sender switch and an idle register-sender. The control unit then operates the trunk switch and register-sender switch which extends the calling incoming trunk to the selected register-sender. The established connection permits the preceding office to inpulse into the register-sender, and permits the register-sender to outpulse to the succeeding office and to control the connection.

The control unit includes a number of scanners comprising decoded BCD counters (DCBD) for scanning the trunk circuits to select and identify a trunk circuit with a call for service, to select an idle register-sender and to select an idle link coupling the trunk and register-sender switches. Other counters, as more fully described below, also are used. The present invention is primarily concerned with the method and means used to check the proper operation of the checking circuits incorporated in the system for monitoring the proper operation of the DBCD counters.

Accordingly, it is an object of the present invention to provide an improved method and means for testing the proper operation of the checking circuits for the counters, within such a system, during either on-line or off-line operation thereof.

Other objects of the invention will in part be obvious and will in part appear hereinafter.

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE INVENTION

As indicated above, the maximum capacity of the crosspoint tandem system is 6,000 incoming trunks, however, these 6,000 trunks are divided into groups of 1,000 trunks, with each group of 1,000 trunks being served by a register-sender access subsystem. The manner in which the 6,000 incoming trunks are served can be understood by reference to the description and operation of one register-sender access subsystem.

Figure 1A:
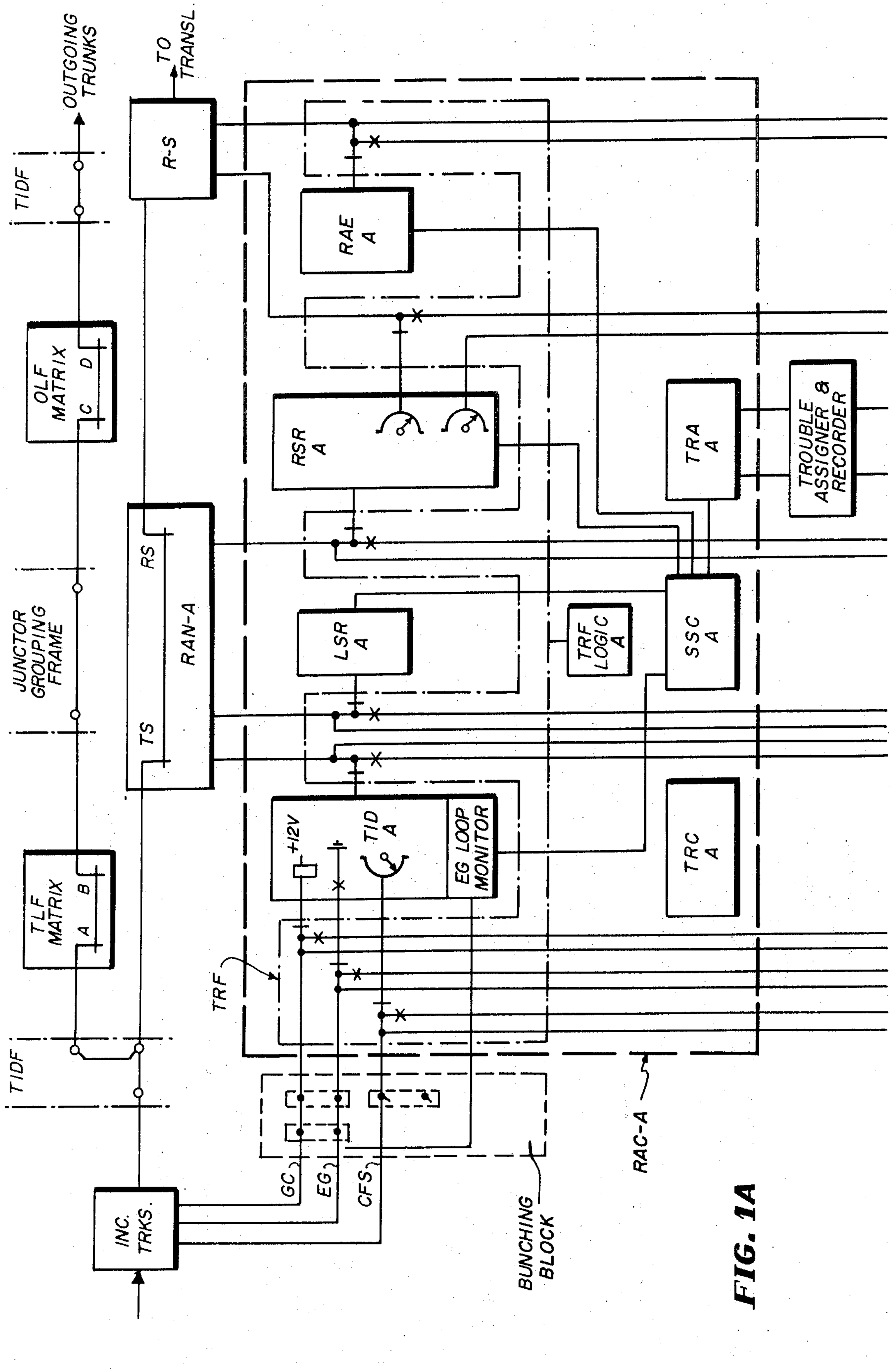
FIGS. 1A and 1B are a block diagram schematic of a register-sender access subsystem.
Figure 1B:
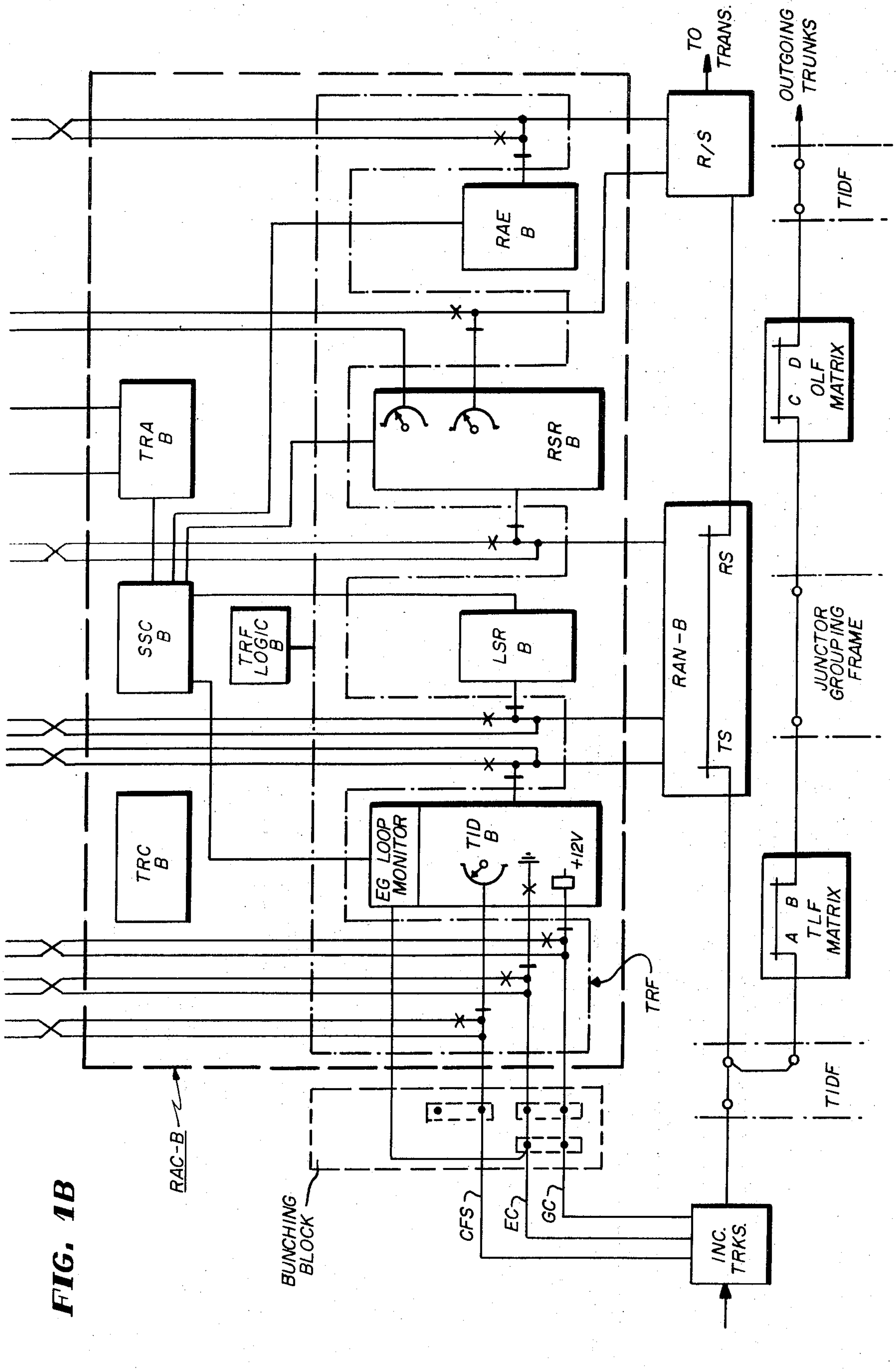

In FIGS. 1A and 1B, the block diagram of one such register-sender access subsystem serving 1,000 trunks is illustrated. It can be seen that this subsystem is divided into two basic units A and B, with each unit serving a maximum of 500 incoming trunks. Each group of 500 incoming trunks is served by a maximum of 50 register-senders, with any one of the 500 incoming trunks being connectable to any one of the 50 register-senders via a register access network RAN (hereinafter referred to as a RAN unit), under the control of a register-sender access control circuit RAC (hereinafter referred to as a RAC unit). A transfer circuit TRF also is provided which, in the event one of the two RAC units RAC-A and RAC-B fails, will signal the operational RAC unit to take over and serve the incoming trunks to both units A and B.

The RAC units are electronic subsystems using electromechanical interfaces to communicate with the adjoining electromechanical subsystems: the incoming trunks, the register-senders, the RAN units and the RAC test equipment. Functionally, the RAC units can be divided into two major logic blocks: the common control logic block which is basically the sequence state controller SSC, and the peripheral logic block comprised of the trunk identifier TID, the link selector LSR, the register-sender selector RSR, the trouble recorder access TRA, the register-Sender access encoder RAE, and the transfer circuit TRF.

The sequence state controller SSC determines the order of events and the major tasks to be performed by the subsystem. The subsystem is "wired programmed" for that purpose. The circuits of the peripheral logic block execute the commands given by the sequence state controller SSC and receive information signals from and extend commands to the adjoining subsystems.

Each RAN unit RAN-A and RAN-B is formed of a number of trunk switches TS and a number of register-sender switches R/S (only one of each being shown) which are grouped as more fully described below. The incoming trunks appear on the trunk switches TS and the register-senders appear on the register-sender switches R/S, and the outputs of the trunk switch TS and the outputs of the register-sender switches are wired to provide links to connect the incoming trunk to the register-senders. The number of trunk switches TS and register-sender switches R/S provided depends on the traffic requirements and the grade of service to be provided. Each RAC unit RAC-A and RAC-B, as indicated above, is formed of a trunk identifier TID, a link selector LSR, a register-sender selector RSR, a register-sender access encoder RAE, a trouble recorder accessor TRA, a transfer circuit TRF, and a sequence state controller SSC.

RAN Units

Referring now to FIGS. 2A–2D, in the illustrated embodiment, the 500 trunks connected to a RAN unit are divided into 10 groups of 50 trunks each (only group 1 and group 10 are shown). The 50 trunks in a group are connected in multiple to 16 trunk switches TS which form a trunk switch shelf. Each of these trunk switches TS is connected with respective ones of 16 register-sender switches R/S which form a register-sender shelf. 50 register-senders are connected in multiple to these 16 register-sender switches R/S. The 16 trunk switches TS and 16 register-sender switches R/S therefore provide 16 links for connecting any one of the 50 incoming trunks to any one of the 50 register-senders. The trunk switches TS forming a trunk switch shelf and the associated register-sender switches R/S forming a register-sender shelf form sub RAN units RAN-A1 through RAN-A10. The 50 trunks in each of the other nine groups are likewise connected in multiple to 16 trunk switches TS, and the latter are connected to respective ones of 16 associated register-sender switches R/S. The 50 register-senders also are multipled to each of the register-sender switches R/S in each group. Each RAN unit thus includes 160 trunk switches TS and 160 register-sender switches R/S, with 160 links between them, for connecting any one of 500 incoming trunks to any one of the 50 register-senders.

Figure 2A:
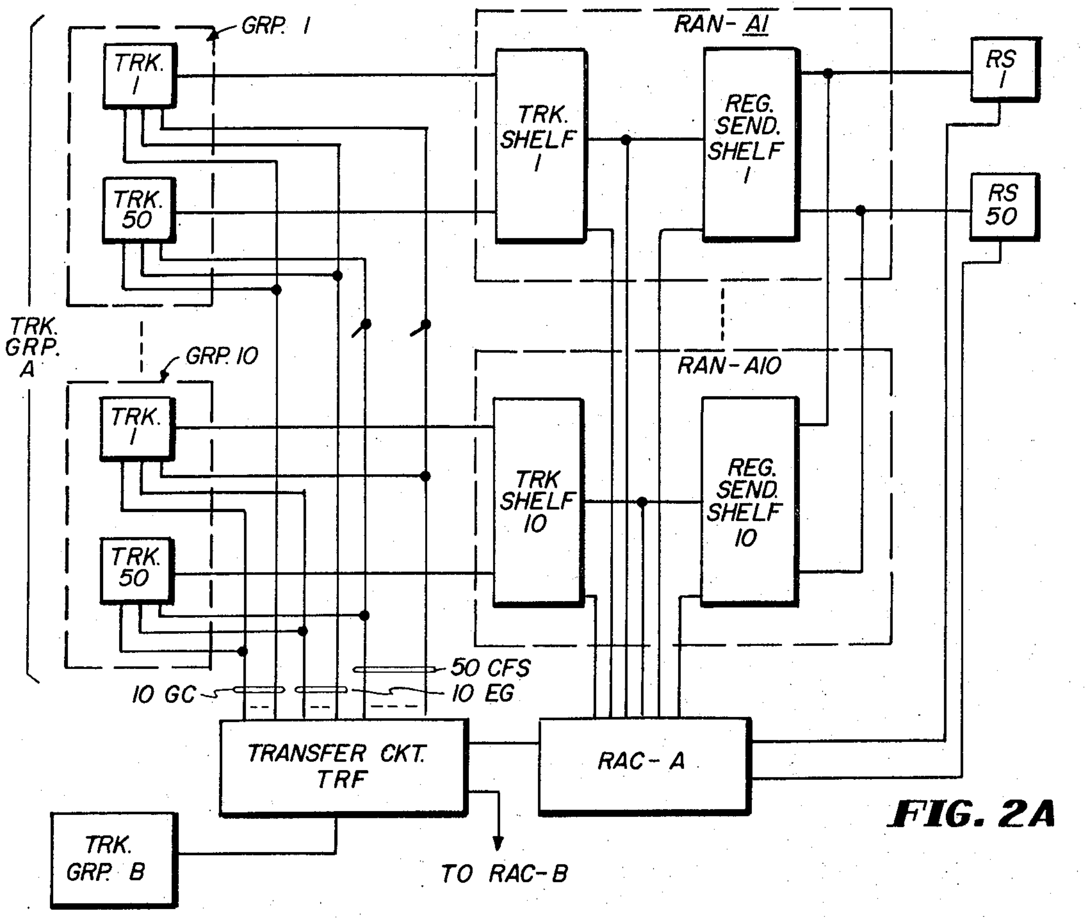
FIG. 2A is a block diagram illustration of the manner in which the trunk circuits are grouped and connected to the RAN units of the subsystem.
Figure 2B:
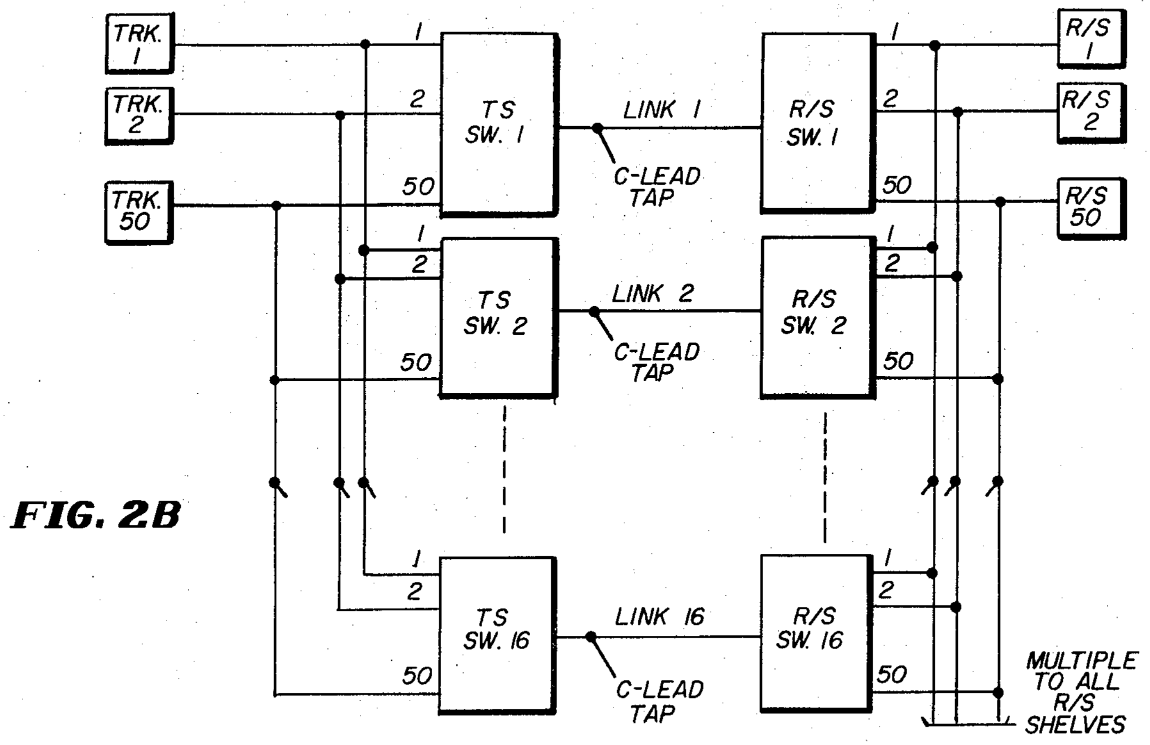
FIG. 2B is a block diagram illustration of the manner in which the trunk switches and the register-sender switches of a RAN unit are linked.
Figure 2C:
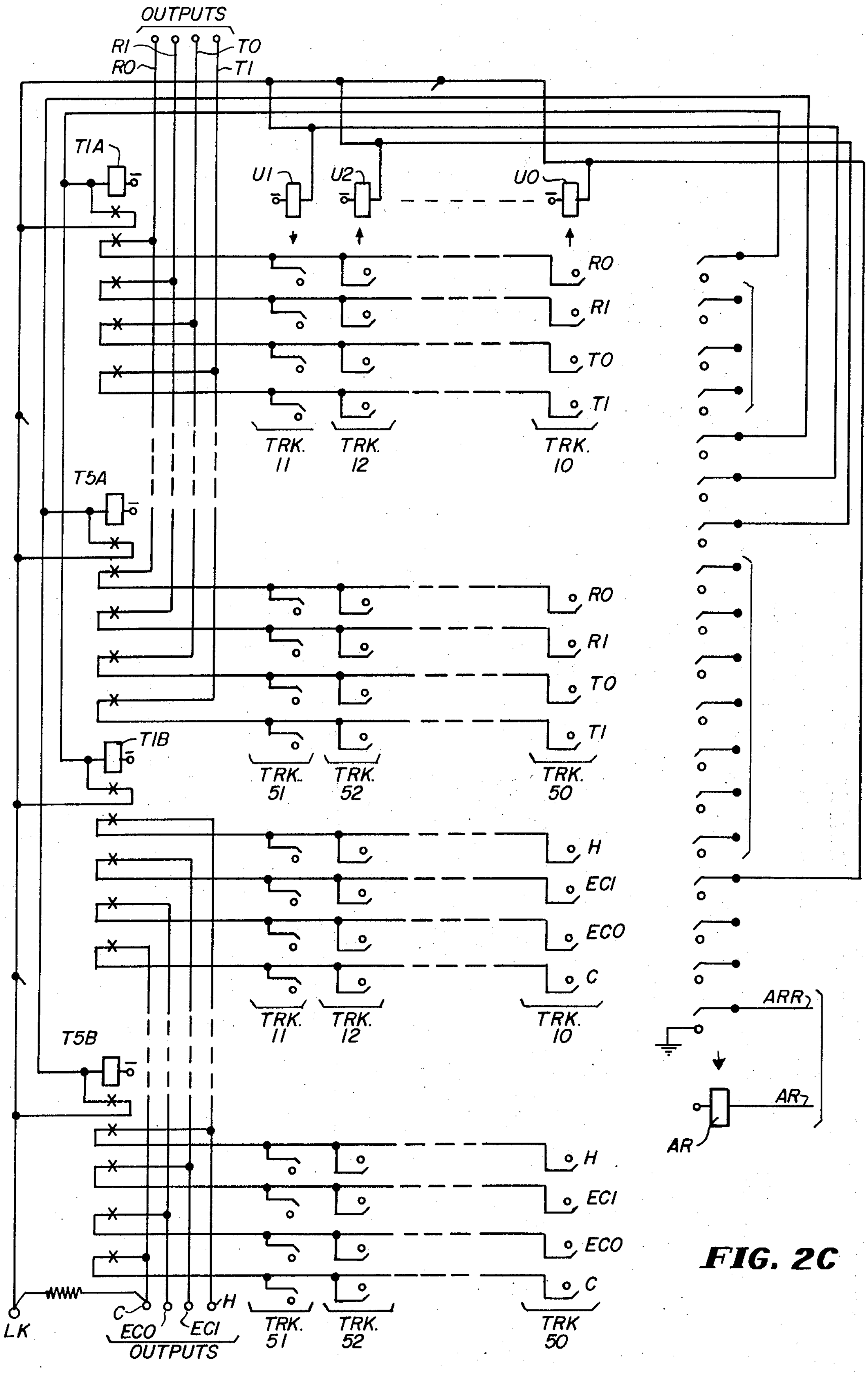
FIG. 2C is a schematic representation of one of the trunk switches.

In FIG. 2C, one of the trunk switches TS is illustrated, and each of the trunk switches TS and the register-sender switches R/S are of a like construction. As indicated above, these switches are of the construction and operation of the relay switch disclosed in U.S. Pat. No. 2,573,889, issued Nov. 6, 1951. Reference may be made to this patent for a detail description and operation of these relay switches, but generally they are 400 point, arranged for 8 wire, relay switches which include a relay matrix formed of 10 UNITS relays and 10 TENS relays, for connecting the eight output conductors RO, RI, TO, TI, ECO, ECI, C and H to any one of 500 bank multiples to which, as indicated, the 50 incoming trunks are connected. The 50 incoming trunks each have 8 wire inputs, as more fully described below. In the illustrated embodiment, the 10 TENS relays are divided into two groups comprising relays 1A–5A and 1B–5B, respectively, with the relays 1A–5A switching the Ro, RI, TO and TI leads, and the relays 1B–5B switching the H, ECI, ECO and C leads. As more fully described below, one trunk in a group of 50 trunks is selected by operating the allotter relay AR of the trunk switch TS to which the group is connected, to close the operate leads of the 10 UNITS and the five sets of TENS relays of that trunk switch TS. The one UNITS and the one TENS lead associated with the one trunk then is marked to operate the UNITS and TENS relay to switch the 8 wire trunk leads RO, RI, TO, TI, ECO, ECI, C and H to the corresponding output conductors of the trunk switch TS. The operated UNITS and TENS relay will lock to a 200 ohm resistance ground on lead LK. It may be noted that the terminals LK and C are tied together via the 200 ohm resistance R1, thus the locking ground which is forwarded to the trunk switch TS on the C lead will appear only after the trunk switch is operated.

Figure 2D:
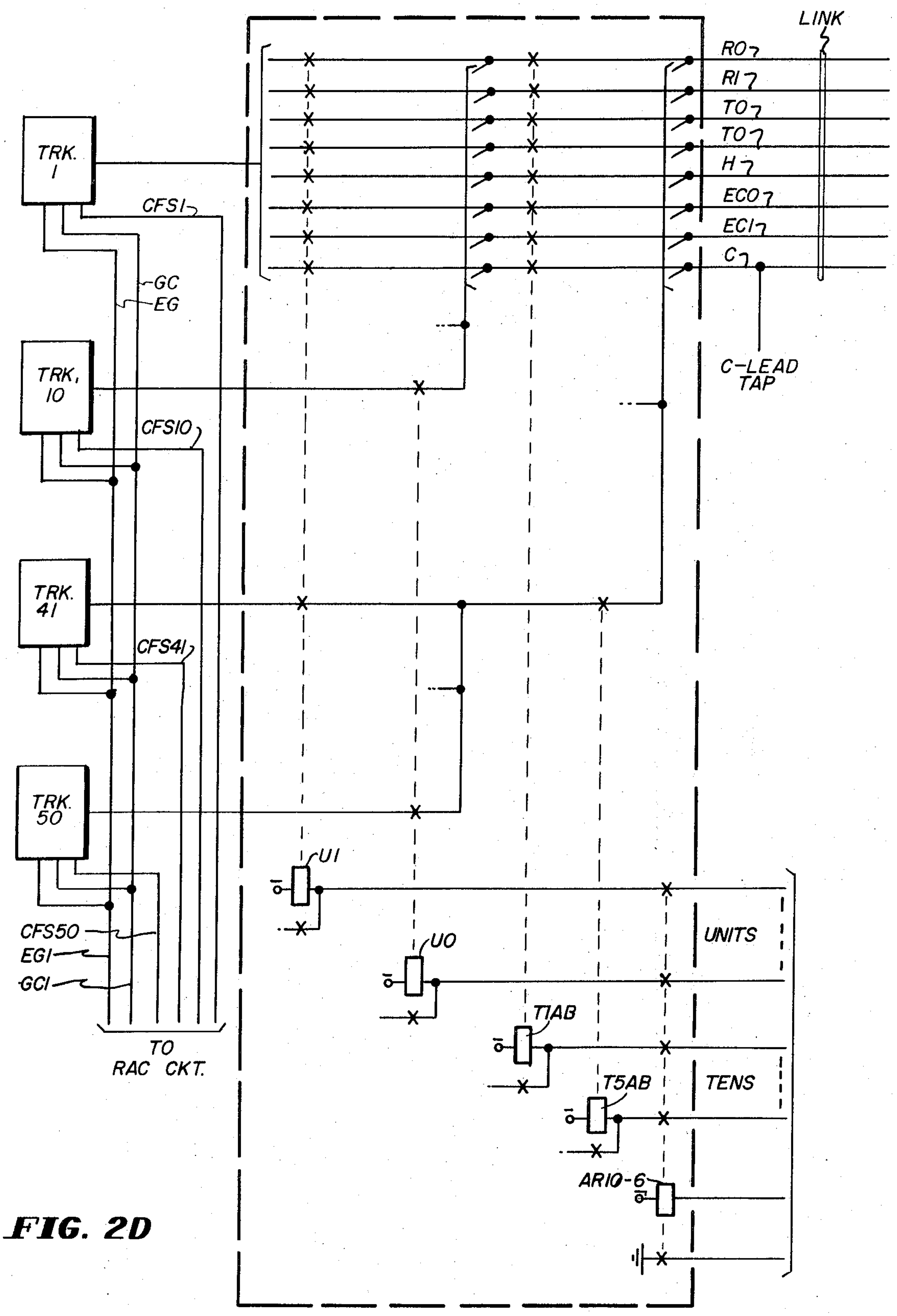
FIG. 2D is a schematic representation of the manner in which a trunk in a trunk group is selected.

In FIG. 2D which is a simplified illustration of the trunk switches TS to which the 50 incoming trunk in a group are connected, the manner in which one group of trunks and one trunk within that group are selected can be described. Each trunk switch to which 50 trunks are connected includes an allotter relay AR, and 10 UNITS relays and two sets of five TENS relays, and these are indicated as UNITS relays U1–U10 and TENS relays T1AB–T5AB, respectively. For simplicity, only the allotter relay AR, the UNITS relays and TENS relays associated with one trunk switch TS are shown, with it being understood that in the relay tree there are actually 16 allotter relays AR and 16 sets of the UNITS and TENS relays.

In selecting one trunk out of the 500 trunks with a call for service, the allotter relays AR of the 16 trunk switches TS with which the trunk is connected are scanned to locate an idle trunk switch TS. The allotter relay AR of the idle trunk switch TS then is operated to close the operate leads of the 10 UNITS relays and the five sets of TENS relays of that trunk switch TS. The one UNITS lead and the one TENS lead associated with the selected trunk switch TS then are marked to operate the UNITS and TENS relay to switch the 8 wire trunk leads to the corresponding output conductors of the trunk switch. For example, assume that the trunk with a call for service is trunk number 41 in group 6. The allotter relays AR of the trunk switches TS in group 6 are scanned to locate an idle trunk switch TS, and it is found that trunk switch TS10 is idle. The allotter relay AR10-6 (allotter relay of trunk switch 10 in group 6) then is operated to close the operate leads of the 10 UNITS relays U1-U10 and the five sets of TENS relays T1AB–T5AB of that trunk switch. The UNITS and the TENS leads associated with the UNITS relay U1 and the TENS relay T5AB then are marked to operate those relays. The register-sender switches R/S are operated in a similar fashion to select an idle register-sender, with the register-sender switch R/S associated with, that is wired with, the trunk switch TS being used in establishing the connection. In other words, in the above-illustrated example, the allotter relay AR10-6 of the register-sender switch R/S 10 of group 6 would be simultaneously selected and operated. The manner in which the selection and operation of the trunk switches TS and register-sender switches R/S are performed is described more fully below in connection with the RAC units.

RAC Units

The purpose of the RAC units is to recognize a call for service from the incoming trunk, and then to connect the trunk to an idle register-sender via a RAN unit. To accomplish this, the RAC unit is interconnected with the respective subsystems as follows.

Up to 500 incoming trunks serviced by one RAC unit are accessed by the latter via three leads, the CFS, GC and EG leads (FIGS. 1 and 2). These leads are multipled, as more fully described below, and provide the call for service signals to the RAC unit. Up to 50 register-senders communicate with the RAC unit over busy idle indication leads BII. The RAC unit accesses the 10 RAN units via two highways, one of which consists of 16 busy link leads BL, 16 select link leads SL, one allotter relay release lead ARR, 10 GROUP leads, 10 ENABLE leads, 16 link seized leads LK SZ, and 16 link seized enable leads LK SZ EN. The second highway contains the TENS and UNITS leads to operate the crosspoint relays of the trunk and register-sender switches.

In normal operation, the operation is generally as follows. When a call for service signal appears on the RAC unit, the trunk identifier TID recognizes and identifies it. The trunk identifier TID also determines in which RAN unit a link is to be established. Then the register-sender selector RSR selects and identifies an idle register-sender to which the incoming trunk requesting service will be connected. Later, the link selector LSR selects one idle link of the 16 links in the group, and identifies it. The signal of the selected link will then operate the allotter relays AR of the trunk and register-sender switches of the RAN unit. The signals of the identified trunk and register-sender will subsequently operate the respective TENS and UNITS relays of the trunk and register-sender switches. Operated, the TENS and UNITS relays will establish an 8 wire path from the incoming trunk to the register-sender. The RAC unit will then release and begin to search for another call for service.

The register-sender access encoder RAE forwards the pertinent data to the register-sender via a 27-lead data highway. The information, for most of the data, is transmitted in a two-out-of-five code. The encoder RAE receives the trunk and link identities from the trunk identifier TID and the link selector LSR respectively. Prior to establishing the link path in the RAN unit, the data is encoded, and along with the pretranslation class mark of the identified trunk, forwarded to the selected register-sender.

In the event when a call for service cannot be processed because of an ALL LINKS BUSY (ALB) or ALL REGISTER-SENDERS BUSY (ARB) condition, the RAC unit will reset. Several attempts will be made to serve the incoming trunk until a register-sender becomes available, or to serve another call for service in the next group where at least one link is available.

The RAC unit is designed to monitor and check the inter-subsystem's highways for open leads and accidental grounds. It also checks most of the important circuits for failures or malfunctions. In the event of failure detection, the RAC unit will call for a trouble recorder and report either the nature of trouble and where the RAC unit has failed, or report just the status of the RAC unit at the time of failure. In all fault cases, when it is not capable to perform its main functions, the RAC unit will, in addition to the trouble reporting, also transfer its function to the second RAC unit of the pair.

The above-generally described operation of the RAC unit can be better understood from the description below of the trunk identifier TID, the register-sender selector RSR, the link selector LSR, and the sequence state controller SSC.

Trunk Identifier

Figure 3:
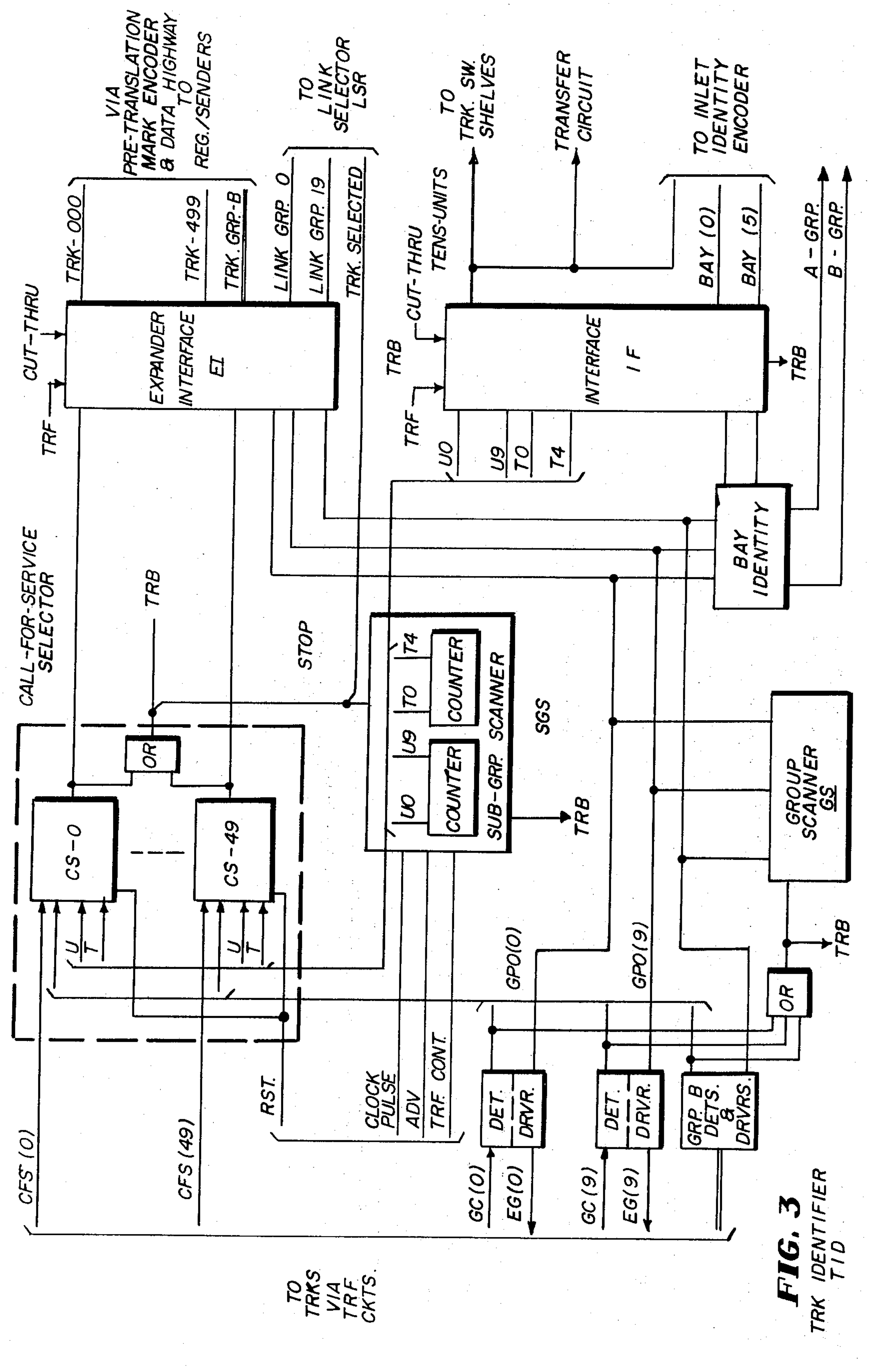
FIG. 3 is a block diagram schematic of the trunk identifier.

Referring now to FIG. 3, which shows the trunk identifier TID in block diagram, the primary function of the trunk identifier is to identify and select one of several trunks requesting service. For this purpose, as can be seen in FIGS. 1A and 1B and FIG. 2D, each of the trunk circuits has three leads EG, GC and CFS which form a call-for-service circuit and function to identify a trunk requesting service. The EG leads of the 50 trunk circuits within a group are multipled to form an ENABLE lead, and these 10 ENABLE leads (one from each of the 10 groups) are coupled through the transfer circuit TRF to the trunk identifier TID. Similarly, the GC leads of the 50 trunk circuits within a group are multipled to form a DETECT lead, and these 10 DETECT leads likewise are coupled to the trunk identifier TID. The CFS leads of all of the correspondingly numbered trunks of each of the 10 groups are multipled (that is, trunks No. 1 of each group are multipled, trunks No. 2 of each group are multipled, and so forth), so as to provide 50 CFS leads which are coupled to the trunk identifier TID.

The trunk identifier TID uses two scanners, one 20 point group scanner GS and one 50 point subgroup scanner SGS. The latter is made up of one five-step TENS counter and one 10-step UNITS counter. Both the group scanner GS and the subgroup scanner SGS are driven by clock pulses from the sequence state controller SSC.

At normal or idle state, the 10 ENABLE leads EG will carry electronic ground to the 10 trunk groups. The group scanner GS (FIG. 3) will operate and scan the respective 10 DETECT leads GC. The subgroup scanner SGS is idle and reset to "zero." The closure of one (or more) call for service circuits by a trunk circuit will apply electronic ground to the corresponding DETECT lead GC and CFS leads of the trunk identifier TID. The group driver detector GDD associated with the requesting trunk (or trunks) will stop the group scanner GS thereby selecting the trunk group, will enable the CFS selectors CSO-CS49, and will remove electronic ground from all but the selected ENABLE leads EG. The group driver detector GDD also starts the subgroup scanner SGS. The selection of a trunk group is performed in a random fashion, with each cycle of the group scanner GS starting at the point of the previously selected trunk group.

The activated CFS selectors will enable the subgroup scanner SGS to find and select one of the marked trunks within the chosen trunk group. To assure random selection of a CFS, the cycle of the subgroup scanner starts at a point N+1 (N is point of previously selected trunk). The signal which stops the subgroup scanner SGS is generated by matching (anding) of the TENS and UNITS counter outputs with a closed call for service (CFS) contact. The outputs of both counters are decoded to form a 50-step scanner.

Once selected, the trunk identifier will stop the subgroup scanner, and will signal the sequence state controller SSC that the selection of a trunk is completed.

The latched group scanner GS and the operated CFS selector CS upon command from the sequence state controller SSC will provide an output to an expander-interface EI to mark the corresponding link group lead to the link selector LSR. The expander interface EI also combines the selected trunk group and information from the CFS selector CS and prepares one path to a pre-translation class mark encoder. The group scanner GS and the CFS selector CS also provide outputs to an expander-interface IF to establish four paths to an inlet identity encoder, two of which represent the bay identity, one the switch identity, and one the horizontal bus identity. The CFS selector CS also provides outputs to the expander-interface IF to establish two paths to the trunk switch shelves, one to the TENS lead and one to the UNITS lead. The expander-interfaces EI and IF include Hg relay drivers for each output lead to interface electronic and electromechanical components, since both the pre-translation class mark encoder and the trunk inlet identity encoder require electromechanical ground as a marking signal.

The group scanner GS, and subsequently the subgroup scanner SCS are caused to search for another call for service, upon receiving an ADVANCE COUNT command from the sequence state controller SSC.

Register-Sender Selector RSR

Figure 4:
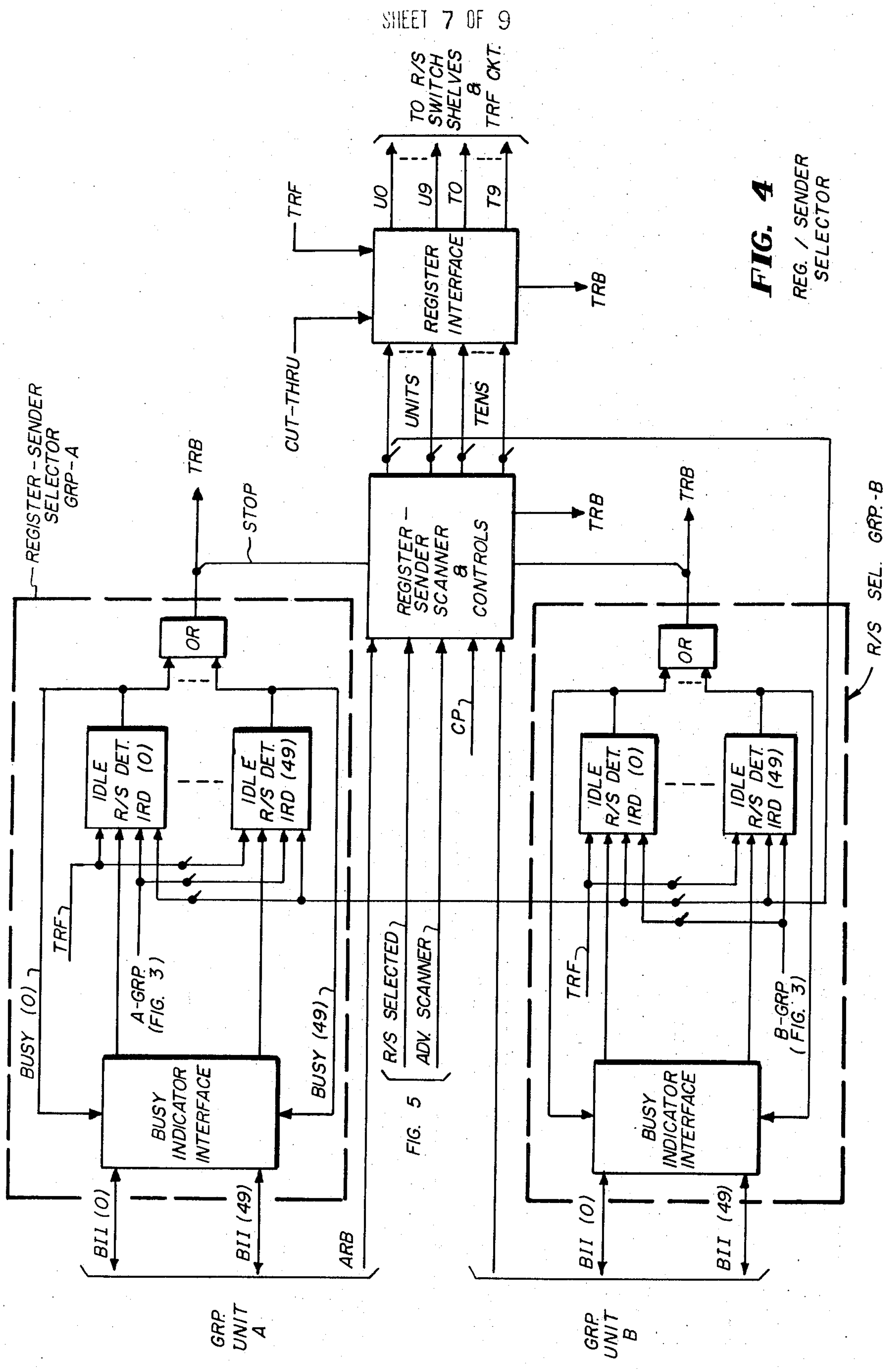
FIG. 4 is a block diagram schematic of the register-sender selector.

The register-sender selector RSR is shown in block diagram in FIG. 4, and its function is to detect and select one idle register-sender. After the selection, the register-sender selector RSR will close a circuit to the corresponding TENS and UNITS leads of the register-sender switch shelves and seize the assigned register-sender.

Each register-sender RS accesses the register-sender selector RSR by means of a busy idle indication lead BII. The 50 BII leads (one from each of the 50 register-senders RS) and one all register-senders busy lead ARB enter the register-sender selector RSR via the transfer circuit TRF. For emergency operation, a second set of 50 BII leads and one ARB lead are connected to the register-sender selector RSR.

The BII leads terminate in a busy indicator and each lead is wired via a SEIZE MRD (mercury relay driver) interface BIF contact to a ground connected BI correed. In the register-sender, the BII path terminates at a battery connected SZ correed. When the register-sender is idle, its SZ correed is not operated, and the series connected BI correed in the register-sender selector RSR is operated. A busy register-sender will apply relay ground to lead BII thus preventing its BI correed from being operated.

The contacts of the correeds are scanned by a register-sender scanner RSS, which is a 50-step scanner driven by clock pulses of a 20 KHZ clock of the subsystem. As the subgroup scanner SGS of the trunk selector TID, the register-sender scanner RSS is made up of two counters, one a 10-point UNITS counter and a five-point TENS counter. The register-sender scanner RSS begins its search for a register-sender as soon as a group call for service has been recognized by the trunk selector TID. The match of a marked scanner output with a closed BI contact will stop the scanner RSS and operate the SEIZE MRD. Operated, the SZ correed will apply relay ground to lead BII and subsequently seize the register-sender. The relay ground on the contact is detected by an associated idle register-sender detector IRD, and the latter stops the register-sender scanner RSS. In emergency, when the register-sender selector RSR serves two groups of register-senders RS, the scanner RSS will scan 100 contacts and select one register-sender from either group, depending on the location of the trunk originating the call for service.

The selection of a register-sender RS is performed at random, that is, the scanner RSS will start its cycle from a point of the previously selected register-sender. For example, after selecting register-sender 15, the scanner RSS will first interrogate register-sender 16, then register-sender 17, etc. The next idle register-sender will then be selected The idle register-sender detector IRD, after completing the selection will seize the selected register-sender RS by applying relay ground to the associated BII lead and signal the sequence state controller SSC that the selection of a register-sender has been made.

The latched register-sender scanner RSS will establish two paths to the register-sender switches R/S, by operating one each Hg driver within a register interface RI from the respective TENS and UNITS DBCD counters thereof. The contacts of each Hg driver, if enabled, will mark a corresponding TENS and UNITS lead of the register-sender switches R/S.

An ADVANCE COUNT command from the link selector LSR to the scanner RSS and at least one idle register-sender will start the scanner RSS to search for another register-sender RS, thus starting a new cycle.

Link Selector LSR

Figure 5:
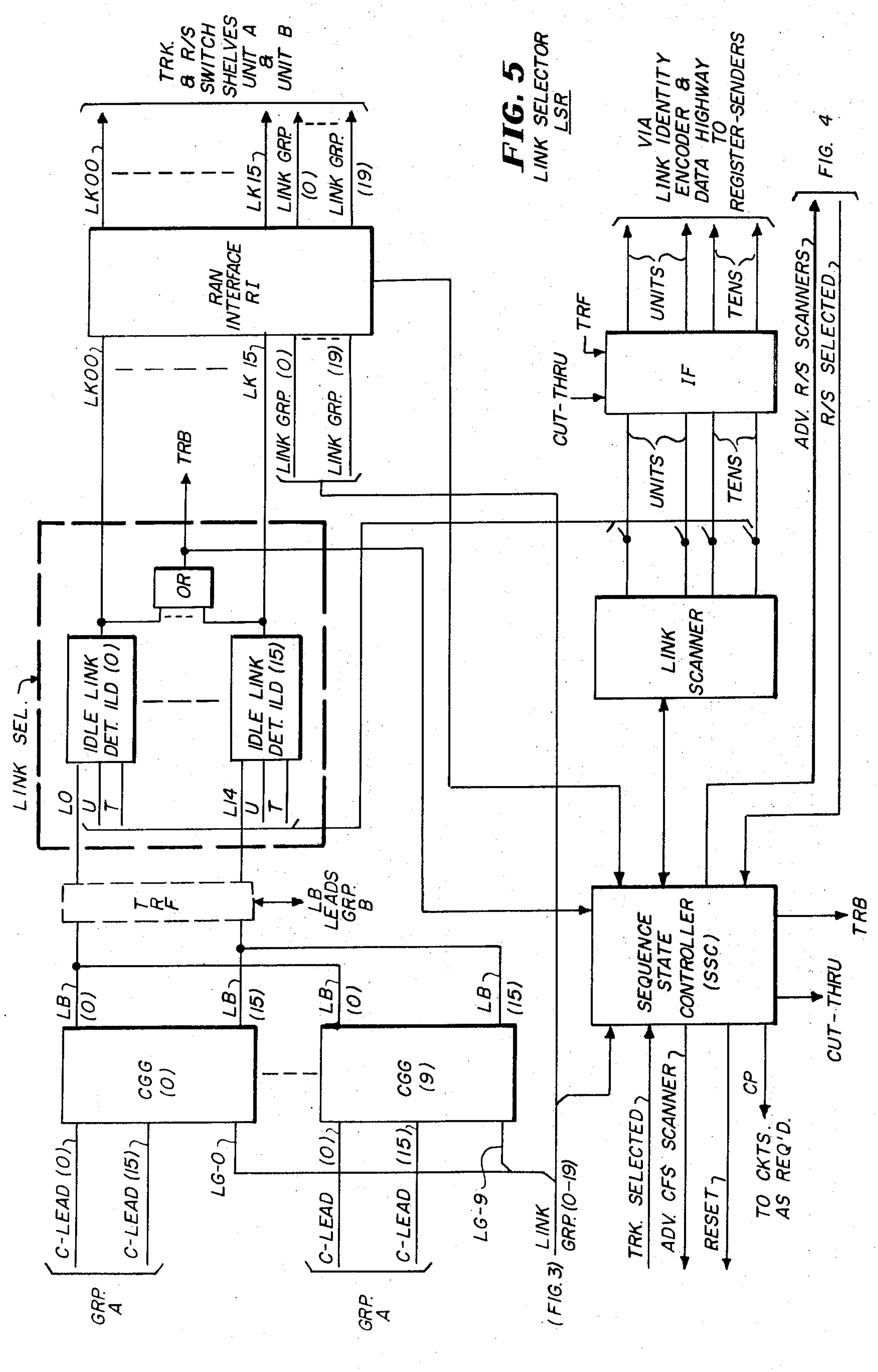
FIG. 5 is a block diagram schematic of the link selector.

The function of the link selector LSR, shown in block diagram in FIG. 5, is to detect and select one idle link between a trunk switch TS and a register-sender switch R/S, to provide a path from the incoming trunk to the selected register-sender RS. The search for an idle link will occur only in the group of switch shelves associated with the selected incoming trunk. The link selector LSR also closes a circuit to a link identity data highway via an appropriate encoder.

An idle link indication is derived from the C-lead connection of the trunk and register-sender switches, by means of a C-lead tap (FIG. 2B). The C-lead taps from each of the 16 trunk-register-sender switches in a group are connected to an associated one of ten C-lead group gates CGG-O to CGG-9. Each of these gates CGG includes a 1A correed wired to an associated C-lead, and a relay ground on the C-lead will operate the correed indicating a busy link. Absence of ground on the C-lead indicates an idle link. The contacts of the correeds are extended through the transfer circuit TRF to idle link detectors ILD(0)-ILD(15).

As indicated above, the trunk identifier TID, after selecting a trunk with a call for service, will apply electronic ground to one of the link group leads 0–15. These link group leads are wired to one side of all correed contacts in the group. A free running link scanner LS, which is a 16-step link scanner driven by clock pulses from a 20 KHZ clock of the subsystem will interrogate these contacts and select the first in line idle link. An associated idle link detector ILD will stop the link scanner LS and prepare two operating paths, one to the allotter relay AR of the trunk switch TS and one to the allotter relay AR of its associated register-sender switch R/S, through an expander interface EI.

In this regard, the output leads from each idle link detector ILD (LK00-LK15) and the link group leads (link group 00–19) are wired to the RAN expander interface RI providing for the selection of one out of 160 allotter relays AR in the trunk and register-sender shelves. Only one AR lead will be energized at a time. The activated idle link detector ILD also will signal the sequence state controller SSC of the selection of an idle link.

The latched link scanner LS also will establish two paths to the link identity encoder.

Sequence State Controller SSC

The sequence state controller performs the common functions for the register-sender access subsystem. It generates the required clock pulses for all scanners, activates the provided timers for monitoring of the progression of each function in the subsystem, and receives completion signals from and generates activate signals to the link selector LSR, the trunk selector TSR and the register-sender selector RSR.

In operating the TENS, UNITS and allotter relays AR of the trunk and register-sender switches, the sequence state controller SSC uses the TRUNK SELECTED, LINK SELECTED and REGISTER-SENDER SELECTED signals to generate the CUT THROUGH signal. The CUT THROUGH signal also activates the data highway by applying relay ground to the operated Hg driver contacts associated with all encoders. The register-sender reads the data from the data highway and applies relay ground to the C lead of the selected link.

When the CUT THROUGH signal is generated, the two allotter relays AR, the two TENS relays and the two UNITS relays of the selected trunk and register-sender switches are operated and extend the ground on the C lead to the CR relay in the trunk and to the 1A correed in the C-lead group gate CGG. The correed will operate and signal the sequence state controller SSC the completion of the cycle. The sequence state controller SSC will then initiate the release of the RAC and RAN units, and after the release, will generate the necessary commands to begin a new cycle.

Register-Sender Access Encoder (RAE)

The function of the register-sender access encoder RAE (FIGS. 1A and 1B) is to encode the inlet identity, the link identity and the pre-translation inlet class marks (PIC). This data originates in the trunk selector TSR and the link selector LSR in decimal form and, for economy and reliability reasons, the decimal digits are converted to a two-out-of-five code.

The trunk inlet identity is comprised of four decimal digits, two digits for the bay identity, one digit for the switch within the bay, and one digit for the horizontal multiple within the switch. The link identity and the pre-translation inlet class marks PIC have a two decimal digit and a one decimal digit format, respectively. The two-out-of-five encoding is accomplished by use of a diode matrix.

Monitoring and Checking

As indicated above, the RAC unit is designed to monitor and check the inter-subsystem's highways for open leads and accidental grounds. It also checks most of the important circuits for failures or malfunctions. In the event of failure detection, the RAC unit will call for a trouble recorder and report either the nature of trouble and where the RAC unit has failed, or report just the status of the RAC unit at the time of failure. In all fault cases, when it is not capable to perform its main function, the RAC unit will, in addition to the trouble reporting, also transfer its function to the second RAC unit of the pair. In performing the monitoring and checking functions, the RAC unit makes use of the decoded BCD counters (DBCD) and one-out-of-10 checking circuits (1/10c) within the trunk identifier TID, the link selector LSR, the register-sender selector RSR and the sequence state controller SSC.

As more particularly described above, the function of controlling of the RAC unit is performed by the sequence state controller SSC which sequences the wired program through its various steps in connecting an incoming trunk circuit calling for service to a register-sender. A sequence state counter of the controller SSC generates 10 states S0–S9, and is driven by a free running 20 kHz, 2-phase clock. The clock pulses CPA and CPB are gated to the sequence state counter, and to the other counters of the RAC unit. The RAC unit is stopped, placed on "Freeze," by inhibiting of the clock pulses. The sequence state counter is advanced by the trailing edge of the clock pulse CPA.

Clock failures, counter malfunctions, some failures to exit a state, time-outs, highway trouble faults, failures to release a CFS in a trunk circuit, or to operate and release a link, or to connect a link group to a RAC unit, will trigger the Freeze logic. Subsequently, the freeze command will generate a Request for Trouble Recorder signal and, if needed, issue a command to the transfer circuit TRF to transfer the RAC unit's load to its mate.

Figure 6:
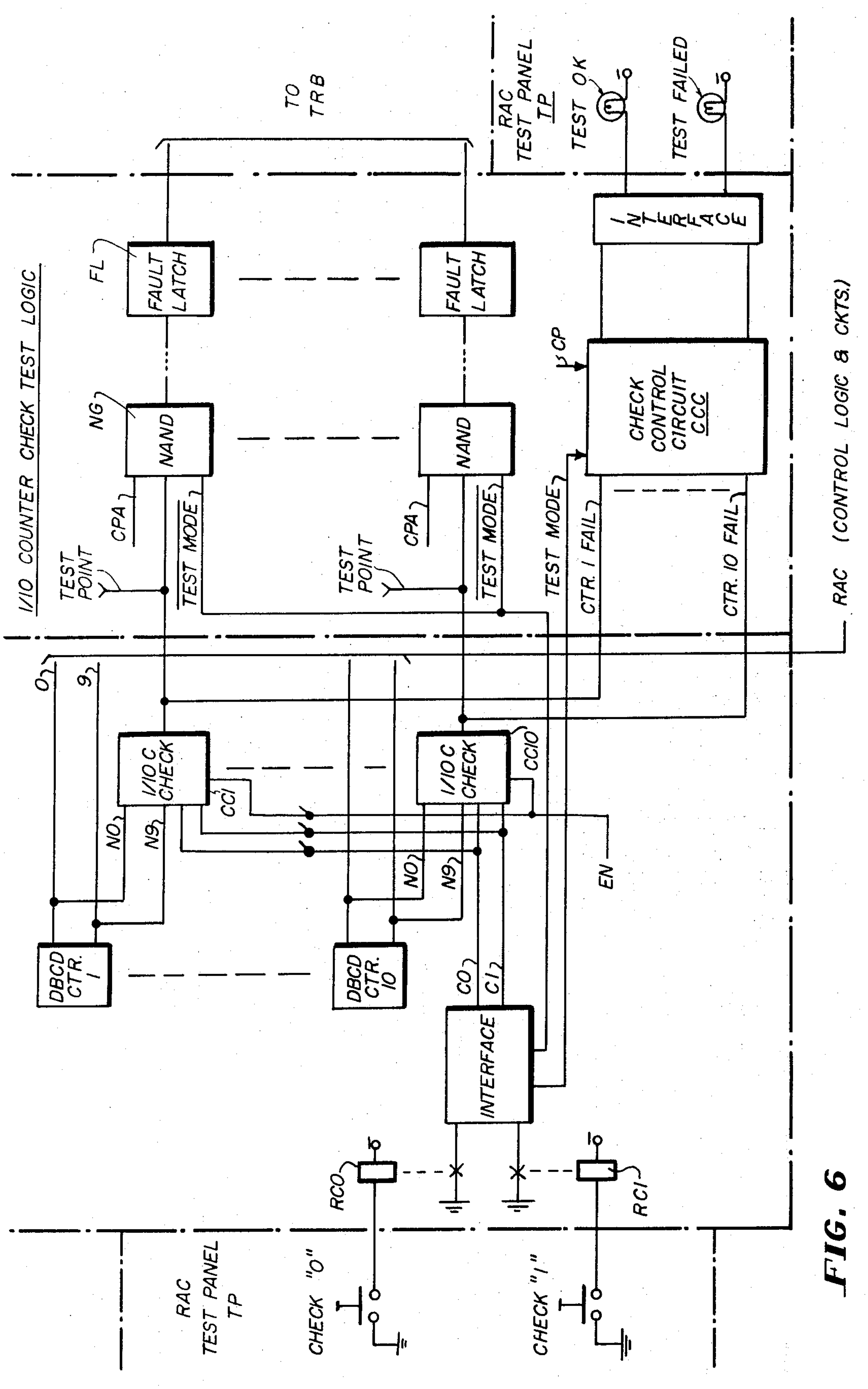
FIG. 6 is a block diagram schematic of the monitoring and checking circuitry for the system's counters.

The fault memory section of the sequence state controller SSC is comprised of several latches FL (only one of which is shown in FIG. 6), each of which is used to memorize one type of fault. The latch is set at the time when the circuit in question is being sampled and when its monitoring circuitry indicates a failure. The fault signals are used by the sequence state controller SSC to initiate the Freeze action. The information on the latch will also be used to light associated lamps on a RAC unit test panel and by the trouble recorder to print a fault report ticket.

When the sequence state controller SSC performs its functions of controlling the peripheral circuits of the RAC unit, it expects to receive certain signals from them verifying that their required functions have been executed.

These verifying signals are expected within a certain time segment, and the arrival thereof will enable the sequence state controller SSC to advance to the next sequence state. A failure to receive the verifying signal within the allotted time segment (XT) for each function will be considered a failure and, depending upon the significance of the signal, will cause the RAC unit to either transfer its function to the other one of the RAC units, or reset the sequence state of the sequence state controller SSC to zero to begin another cycle.

In other cases, the verifying signal may not be readily obtainable, in which case, the RAC unit allots an XT segment to perform certain tasks and, upon arrival of the verifying signal, will exit the particular sequence state.

To generate the time segments XT, the sequence state controller employs two DBCD counters driven by a free running 735Hz clock. These counters, with their controls, form the XT counter circuit which is capable of generating up to 24 XT time segments (XT1 through XT24).

As previously described, these XT time segments are used throughout the entire cycle of the RAC unit. It is therefore important to check the XT counters to assure the generation of only one XT time segment at a time. These XT counters are checked with 1/10c checking circuits, described more fully below.

The trunk identifier TID, as described above, consists of a group scanner GS and a subgroup scanner SGS, both of which are driven by the clock pulses CPB from the sequence state controller SSC. The subgroup scanner SGS is made up of one 5-step TENS counter and one 10-step UNITS counter. To insure the proper operation of the subgroup scanner, each counter is monitored by a one-out-of-10 check circuit (1/10c). The check circuit (1/10c) along with the highway monitoring circuitry is activated by the sequence state controller SSC. In case of failure, the fault signals are extended to the sequence state controller SSC and to the test panel equipment.

The register-sender selector RSR also includes a register-sender scanner RSS driven by the clock pulses CPB from the sequence state controller SSC. This register-sender scanner RSS is made up of two counters, one a 10-point UNITS counter and the other a five-point TENS counter.

To insure the proper operation of the register-sender scanner RSS in selecting only one register-sender at one time, and to prevent the register-sender selector RSR from connecting an incoming trunk to more than one register-sender, each of the two counters of the register-sender scanner RSS are monitored by a one-out-of-10 checking circuit (1/10c). This checking circuit (1/10c), along with the highway monitoring logic, is activated by the sequence state controller SSC during its cycle. Any detected faults will be reported via the sequence state controller SSC to the trouble recorder and/or displayed on the individual test panels of the test panel equipment.

The link selector LSR also includes a link scanner LS which is a 16 step counter driven by the clock pulses CPB from the sequence state controller SSC. Only one link must be selected at a time to prevent a double cross-connection in the RAN unit. To insure this, the link scanner LS is monitored by a one-out-of-10 checking circuit (1/10c). A malfunction of the link scanner LS will be reported to the sequence state controller SSC for further actions.

These counters of the trunk identifier TID, the register-sender selector RSR, the link selector LSR and the sequence state controller SSC all are decoded BCD counters (DBCD) and, as indicated above, the outputs of these counters all are monitored by one-out-of-10 (1/10c) checking circuits activated by the sequence state controller SSC, to detect any faults in their operation. The monitoring and checking circuitry also includes an arrangement for testing the proper operation of these 1/10c checking circuits, during either on-line or off-line operation, as more fully described below.

In FIG. 6, 10 of the DBCD counters are shown and it can be seen that each have ten output leads 0–9 which provide an output count and are connected in its associated subsystem for this particular purpose to, for example, perform the scanning function. These output leads 0–9 of each of the DBCD counters are tapped and coupled to an associated one of the ten one-out-of-10 (1/10c) checking circuits CC1 thru CC10.

These 1/10c checking circuits CC1–CC10 each has three types of inputs: the tapped inputs NO–N9 from the DBCD counters, routining inputs C1 and C0 and an enable input EN. With the EN input at "1," the 1/10c circuits have three modes of operation as described below. The reference to inputs applies to all inputs except CO and EN.

Mode 1: With all inputs a "0," the resulting output on its lead CTR/FAIL is a "1."

Mode 2: One input at "1," the output on its lead CTR/FAIL is a "0."

Mode 3: Two or more inputs at "1," the output on its lead CTR/FAIL is a "1."

The two inputs C1 and C0 are used to test the circuit for proper operation, as more fully described below.

During counting, only one of the ten output leads 0–9 of a DBCD counter should have an output (in the illustrated embodiment, a logic "1") on it. These DBCD counters each are monitored for proper operation during the normal mode of operation of the RAC unit, by the sequence state controller SSC applying a logic "1" to the enable leads EN of each of the 1/10c checking circuits. If at this time, all of the inputs are a "1," the output on its lead CTR/FAIL will be a "1," indicating that its associated DBCD counter has failed. The failure indication is coupled via the lead CTR/FAIL to a NAND gate N6 which upon coincidence of the clock pulse CPA, the test mode signal (described more fully below) and the failure indication is enabled to operate the fault latch FL associated with the DBCD counter and located in the sequence state controller SSC. The latter, in turn, reports the failure and initiates proper remedial action, in the manner more particularly described above. The test panel equipment provides an indication of the failure, and a printout, of the particular counter which failed.

While each of these DBCD counters are being constantly monitored for proper operation by the 1/10c checking circuits, one or more of the 1/10c checking circuits may be faulty, and fail to provide an indication of the failure of one of the DBCD counters. Normally, in most prior systems, a sybsystem such as the RAC unit would have to be taken off-line to test the operation of the built-in check circuitry, such as the 1/10c checking circuits. In the present system, these 1/10c checking circuits can be tested for proper operation, while the RAC unit is on-line, as described below.

To check the proper operation of the 1/10c checking circuits, the C0 and C1 leads thereof are connected through an interface CK to a logic "1" input via the contacts of relays RC0 and RC1, respectively. These relays RC0 and RC1 are arranged to be manually operated by means of a pair of manually operated pushbutton switches CHECK "0" and CHECK "1" on a test panel TP of the RAC unit. The CTR/FAIL leads of each of the 1/10c checking circuits are connected to a check control circuit CCC which has two output leads connected through a panel interface CI to a TEST O.K. lamp and a TEST FAILED lamp on the RAC unit's test panel TP.

During normal operation, as described above, the DBCD counters are advanced by the clock pulses CPA or CPB and, subsequently, the outputs thereof are monitored and checked by the 1/10c checking circuits when they are enabled by the sequence state controller SSC. To test the proper operation of the 1/10c checking circuits, a TEST MODE signal is generated by operating either pushbutton CHECK "0" or CHECK "1" which effectively enables the 1/10c check control circuit CCC. In addition, an on-line test, or off-line test (depending upon which test mode of the RAC unit is activated) switch (not shown) which couples an operating ground to one terminal of each of the CHECK "0" and, CHECK "1" pushbuttons, for the relay RC0 and RC1, is operated. The on-line (or off-line) switch prevents inadvertent initiation of the testing of the 1/10c checking circuits which could falsely indicate a failure of one or more of the DBCD counters.

After operating the on-line (or off-line) switch, one or the other of the CHECK "0" and CHECK "1," pushbuttons is operated, to operate the relays RC0 and RC1, respectively, to extend a logic "1" to the 1/10c checking circuits. When the EN inputs are at a "0" (the EN inputs will be at a "0" except during the normal sequence of operation when they are at "1" to enable the 1/10c checking circuits to monitor the operation of the DBCD counters), the output of the 1/10c checking circuits will always be a "1," independently of the inputs on the other leads thereof. However, when the relay RC0 is operated to place a logic "1" on the C0 lead, the 1/10c checking circuits will test for a MODE 1 operation, by simulating all of its inputs being at a "0." If the 1/10 checking circuits are properly monitoring the DBCD counters for a "0" input on all leads 0–9 which would indicate a failure of the associated DBCD counter.

Correspondingly, when the relay RC1 is operated to place a logic "1" on the C1 leads, the 1/10c checking circuits will test for a MODE 3 operation, by simulating two or more of the inputs of the respective ones of them being at "1." Again, if the 1/10c checking circuits are operating properly, the resulting outputs all should be at a "1," indicating that the 1/10c checking circuits are properly monitoring the DBCD counters for a "1" input on more than one output lead which would indicate a failure of the associated DBCD counter.

The testing of the 1/10c checking circuits in the above described fashion will not interfere with the normal operation of the system since the NAND gates NG are disabled from setting the fault latches in the sequence state controller SSC, by the removal of the test mode signal coupled to it during normal testing. In other words, when one of the pushbuttons check "0" or "1" is operated, the signal test mode is true.

To determine which of the 10 1/10c checking circuits failed, if a failure is indicated, the maintenance man checks the test points associated with each of the 1/10c checking circuits. These test points all can be located on a single panel of the test panel TP, for ready accessibility.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a communication switching system including a plurality of incoming trunks, a plurality of register-senders, a switching network for connecting any one of said incoming trunks with any one of said register-senders, a trunk identifier for scanning and selecting an incoming trunk with a call for service, a register-sender selector for scanning and selecting an idle register-sender, a link selector for scanning and selecting an idle link within said switching network, and a sequence state controller for controlling the operation of said trunk identifier, said register-sender selector and said link selector to connect a selected incoming trunk to a register-sender through said switching network, said trunk identifier, said register-sender selector, said link selector and said sequence state controller comprising counter means forming scanners and timing interval generating means, wherein the improvement comprises a counter check means associated with each of said counter means for verifying the proper operation thereof and providing a failure indication of the failure thereof, verifying means for verifying the proper operation of said counter check means by detecting said failure indications provided by said counter check means and for providing a failure indication of the failure thereof, and test means coupled to said counter check means and operating the latter to simulate a failure of its associated counter means, whereby said verifying means provides said failure indication in the event said counter check means fails to provide a failure indication when operated to simulate a failure of its associated counter means.

2. In the communication system of claim 1, wherein said verifying means is operable to simultaneously verify the proper operation of a plurality of said counter check means, said test means simultaneously operating said plurality of counter check means to simulate the failure of their associated counter means, said verifying means providing a failure indication in the event any one of said counter check means fails.

3. In the communication system of claim 2, wherein a test point is associated with each of said counter check means for testing the individual ones thereof to determine which one of them failed when operated to simulate a failure of its associated counter means.

4. In the communication system of claim 2, wherein said counter check means are enabled during a pre-established time interval during each cycle of operation of said sequence state controller to check the operation of said counter means, whereby the proper operation of said counter means is automatically verified during each cycle of operation of said sequence state controller.

5. In the communication system of claim 4, wherein said test means are manually activated to operate said counter check means to simulate a failure of its associated counter means.

6. In the communication system of claim 5, wherein said failure indications provided by said counter check means are coupled to trouble recording apparatus to provide a record of said failures, said arrangement further including gate means included in the coupling between said counter check means and said trouble recorder, said gate means being disabled when said test means is operated to prevent said failure indications from being coupled to said trouble recorder and falsely indicating a failure when said counter check means are operated to simulate failures of their associated counter means.

7. In the communication system of claim 6, wherein said arrangement further includes a pair of lamps on a test panel for indicating the failure or success of the test of said counter check means, said verify means being coupled to said pair of lamps and lighting the appropriate one of them to indicate the results of said test.

* * * * *